June 7, 1960
D. E. NORGAARD
2,940,056
MODULATOR AND MODULATION SYSTEM
Filed June 1, 1956
3 Sheets-Sheet 1
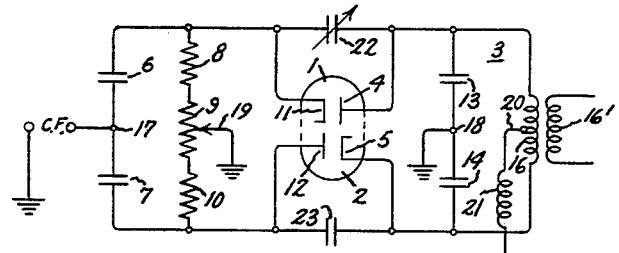
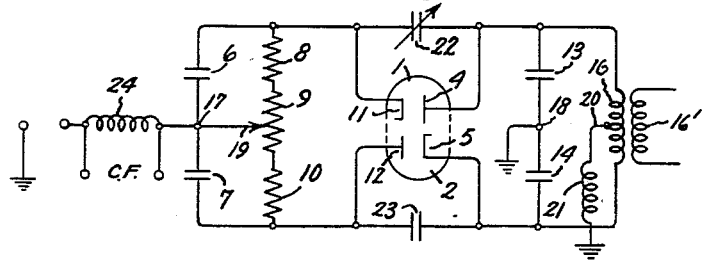
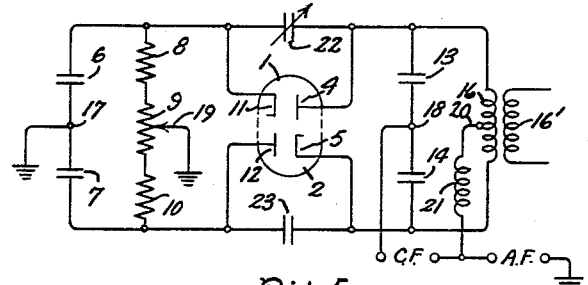
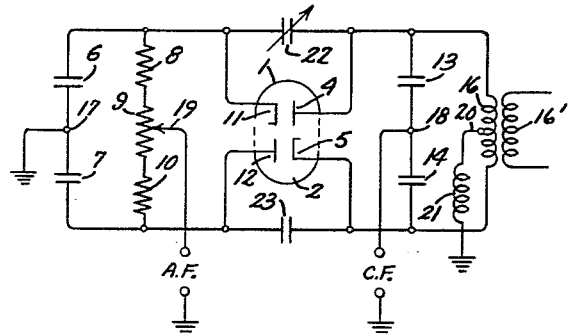
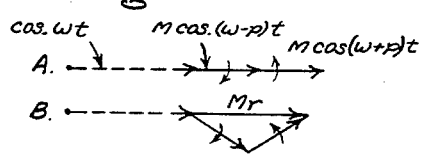
*Inventor:*
Donald E. Norgaard,
by Paul A. Frank
His Attorney.

June 7, 1960

D. E. NORGAARD 2,940,056

MODULATOR AND MODULATION SYSTEM

Filed June 1, 1956

Inventor:
Donald E. Norgaard,
by Paul A. Frank
His Attorney.

United States Patent Office 2,940,056
Patented June 7, 1960

2,940,056

MODULATOR AND MODULATION SYSTEM

Donald E. Norgaard, Schenectady, N.Y., assignor to General Electric Company, a corporation of New York Filed June 1, 1956, Ser. No. 588,861

9 Claims. (Cl. 332—44)

This invention relates to a balanced modulator for producing a double side-band, suppressed-carrier signal and, more particularly, to a level governing modulation system incorporating such a modulator.

Modulators to convert an input signal, in response to a reference carrier signal, to a suppressed carrier, double side-band output signal, have been in use for many years. However, a common difficulty with such prior modulators has been the presence of carrier signal components in their output. Suppression of the unwanted components generally has depended upon obtaining and maintaining balance between a pair of vacuum tubes operated in push-pull relationship. With prior devices close regulation of operating voltages, frequent balancing adjustments as the tubes age, and protracted calibration of circuit parameters when tubes are replaced are necessary. The cost of low-level modulation devices is greatly increased by these considerations when dependable carrier suppression is required.

It should be understood that as used throughout the specification "audio frequency" and "audio signal" are relative terms used to distinguish from radio-frequency signals and should not be considered as referring only to the restricted frequency range of the audible spectrum.

Especially in level governing modulation systems for communication, it is of prime importance that extraneous signal components from reference or gain control signals are absent from the modulator output where they would appear as extraneous gain reduction noise, a "thump" or "crackle," to a listener. Prior fast acting level governing systems have not been satisfactory in this respect.

It is an object of the present invention to provide an improved modulator having substantially no unbalanced carrier signal components in its output.

A further object is to provide an improved balanced modulator to convert an input signal in response to a reference carrier signal to a suppressed-carrier double side-band output signal, which modulator utilizes standard components and obviates selection of balanced pair vacuum tubes.

A further object is to provide an improved level governing modulation system which has substantially no gain control signal components in its output.

A still further object is to provide an improved level governing modulation system in which gain control is applied to a suppressed-carrier double side-band signal in a frequency band displaced from the frequency band of the signal to be controlled.

According to the illustrated embodiment of this invention, the balanced modulator comprises a bridge network including a pair of active elements common to the path of both an audio frequency input signal and a high frequency carrier signal and balancing means for the capacitive and resistive carrier signal components to produce a double side-band output signal having no carrier frequency components. The modulator cooperates with means for controlling gain in the double side-band signal in accordance with predetermined characteristics of the audio signal and means to reconvert the gain-controlled signal to its original frequency band to provide a fast acting level governing modulation system having substantially no extraneous gain control noise in its output.

The features of my invention which I believe are novel are set forth with particularity in the appended claims. My invention itself, however, both as to its organization and method of operation, together with further objects and advantages thereof, may best be understood by reference to the following description taken in connection with the accompanying drawings, wherein:

Figure 1 is a detailed circuit diagram for the balanced modulator of this invention;

Figure 2 is a vector diagram representing the suppressed-carrier double side-band output of the modulator of Figure 1;

Figures 3, 4 and 5 illustrate alternative embodiments of the modulator of Figure 1;

Figure 6:
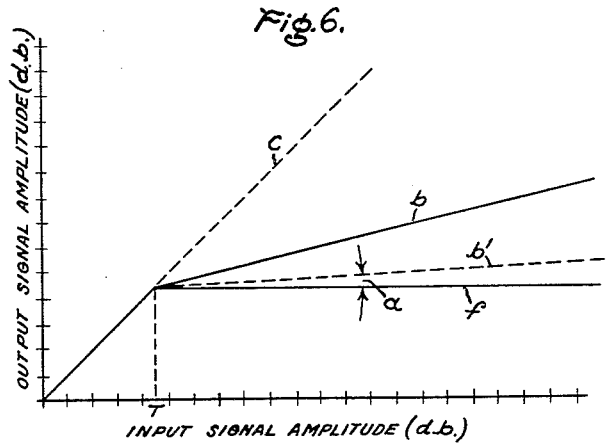
Figure 6 illustrates the output-input or gain relationship for the level governing modulation system of this invention.

Referring now to Figure 1 there is illustrated an embodiment of a balanced modulator of this invention which satisfies requirements of low distortion, stable carrier suppression, and simplicity of construction and adjustment. Two thermionic diode halves 1 and 2 of a single tube which may be of the 6AL5 type comprise the active element of the modulator. A resonant output circuit 3 is connected between the anode 4 of diode 1 and the cathode 5 of diode 2. A parallel circuit comprising a capacitive path including capacitors 6 and 7 and a resistive path including resistors 8, 9 and 10 is connected between the cathode 11 of diode 1 and the anode 12 of diode 2. The capacitive branch of the resonant output circuit comprises capacitors 13 and 14 and the inductive branch comprises inductance 16. Each of the capacitive circuits is provided with an intermediate tap as at 17 and 18 as is the inductance 16 at 20. Resistor 9 is provided with adjustable intermediate tap 19. Inductor 16′ represents an inductive coupling means for a utilization circuit.

It is apparent that both a resistive path and a capacitive path exist for coupling energy to the output circuit. Carrier excitation may be applied at intermediate tap 17 and audio signal excitation supplied through radio frequency choke 21 to the intermediate tap 20 of inductor 16. Although other diodes, such as germanium or silicon semiconductor types may be employed, it has been found that the noise energy incidental to their operation is materially greater than that of thermionic diodes, and therefore their use is less desirable in this application.

Because of the bridge arrangement illustrated, balance means for each basic type of coupling, resistive and capacitive, may be readily afforded to suppress transfer of carrier enregy to the output circuit. An adjustable capacitor 22 is shunted across diode 1 to allow capacitive or quadrature balance and, in order that this capacitive balance may always be obtained, a small fixed capacitor 23 is shunted across diode 2. Conditions of resistive or "in-phase" balance can be established by adjustment of the intermediate tap 19 on resistor 9. The capacitive and resistive adjustments are substantially independent from one another and are of such a simple nature that they are readily performed.

The capacitive balance is quite stable because shifts in this respect are mainly of mechanical origin. Although such changes may be detected in each diode element due primarily to thermal effects, the difference between capacitances of the two diodes in the same envelope remains very nearly constant. Replacement of one tube by another requires only minor adjustment of capacitor 22 for restoration of capacitive balance.

Heater power variations and deterioration of emission with age may change the value of the forward resistance of a diode element. Therefore, resistors 8 and 10 are provided to effect a buffering or swamping action to minimize total circuit variations upon change of forward resistance of the diode in each diode branch. As is true in the case of quadrature balance, the bridge arrangement puts a premium only on differential behavior of the two branches of the bridge with regard to variations of forward resistance with time.

Operation of the balanced modulator may be explained considering first that there is no low frequency input and that the lower terminal of choke 21 is grounded. In this condition a positive carrier signal peak applied at 17 will appear on cathode 11 and on anode 12 and only diode 2 will conduct. The electron current from diode 2 tends to charge capacitor 7 negatively. A negative carrier signal peak applied to cathode 11 and anode 12, however, will cause diode 1 only to conduct, tending to charge capacitor 6 positively. After a few cycles of the carrier, capacitors 6 and 7 will both be charged to a voltage approximately equal to the peak value of the input signal. The resistive paths through resistors 8 and 9 to ground and through resistors 10 and 9 to ground tend to discharge capacitors 6 and 7 between the respective carrier signal peaks. Resistive and capacitive balance is achieved by adjustment of capacitor 22 and the position of intermediate tap 19 of resistor 9 so that a steady state condition is reached in the output circuit 3. That is, no net carrier signal component is applied to inductor 16. Consequently, there is complete carrier suppression and no signal output from the modulator.

Further, by way of explanation, consider a positive unipotential bias applied to choke 21 which potential then appears on anode 4 and cathode 5. In this case the net conduction of diode 1 is enhanced while that of diode 2 is reduced. Hence a new steady state condition is reached wherein a signal is applied to resonant circuit 3. If the applied voltage were reversed in polarity, the output of the modulator would be reversed in phase. It follows then that an applied sinusoidally varying modulating signal will result in a double-side band output signal without any carrier signal component.

The double-side band signal may be conveniently explained with reference to the vector diagram of Figure 2. The carrier component cos ($\omega t$) does not appear in the output of the modulator but is shown as a dotted vector to establish a reference basis for purposes of easy visualization. Moreover, the vector representing the carrier component is considered as stationary and the rotation of the signal vectors relative to the carrier component only are considered. The lower side-band signal is represented at A by the voltage vector $M \cos(\omega-p)t$ and the upper side-band signal by the voltage vector $M \cos(\omega+p)t$ where M is the magnitude of the individual modulation components in the output ($\omega$ is $2\pi$ times the frequency of the carrier, and $p$ is $2\pi$ times the frequency of the modulating signal). Of course, rotation of the vectors representing the modulation components relative to the carrier component occurs at the modulating frequency. It will be apparent, then, that the locus of the resultant double-side-band signal $M_r$ is at all times along the extension of the voltage vector of the carrier signal as illustrated at B. The magnitude of the resultant signal $M_r$ varies according to the relationship $M_r = 2M \cos(pt)$.

A unique feature of this modulator is that the high and low frequency signal inputs need not be restricted to the circuit positions illustrated in Figure 1. Mechanical or operational features may make other embodiments expedient. Applications wherein, for example, two or more modulators are coupled to the same output circuit may advantageously be instrumented by alternative input positions.

Figure 3 illustrates an alternative arrangement in which both the audio frequency signal and the carrier frequency signal are additively coupled to one side of the diode bridge. In this arrangement intermediate taps 17 and 19 are tied together in series with an inductor 24 and the audio frequency input. The carrier frequency input is impressed across inductor 24. Intermediate tap 18 and choke 21 are grounded as shown.

Figure 4 illustrates an arrangement converse to that of Figure 3 in which both the audio frequency signal and the carrier frequency signal are applied to the output circuit of the modulator. The audio frequency signal is applied through inductor 21 and the carrier signal is applied at intermediate tap 18 with respect to ground.

Figure 5 illustrates an arrangement converse to that of Figure 1, carrier frequency input being to the resonant output circuit at intermediate tap 18 and the audio frequency input being at intermediate tap 19.

The balancing and stability features of the balanced modulator make it adaptable as a component of a unique system for controlling the amplitude of an audio signal. Since output of the modulator is free of any carrier components and may be in a frequency band displaced from that of the modulating signal, gain control signal applied to such a double side-band analog of an input audio signal need not appear in the audio signal upon demodulation. This means that overlapping of the frequency spectra of a gain control signal and a controlled signal can be readily prevented. Thus, a balanced gain control stage is not necessary, and problems associated with shift of balance at various amounts of gain do not arise.

Referring now to Figure 6 there is illustrated a graph of the output versus input signal or gain control relationship for the level governing modulation system of this invention. Signal output is plotted versus signal input in identical decibel units. Below a predetermined threshold value T for the input signal there is a one-to-one relationship between output and input signal, that is, a slope of unity. For input signals having peaks greater than the threshold value T, gain reduction commences and the output signal level is confined to a region lying below the unitary slope characteristic of an amplifier with constant gain. For "backward acting" gain control, that is, gain control action governed by the output signal of a gain control system, the output signal initiated by an input signal level greater than T can be made to follow a substantially linear relationship as at b. This curve may have a slope of from unity to a value approaching zero, but not including zero, because there is a finite limiting slope $\alpha$ dictated by the feedback nature of backward-acting gain control. With "forward-acting" gain control where the gain control action of the limiting amplifier is governed by the input signal, output signals corresponding to input signal levels exceeding T are in accordance with a relationship $f$ which may have a slope of unity or less, including zero slope and negative slopes.

Figure 7:
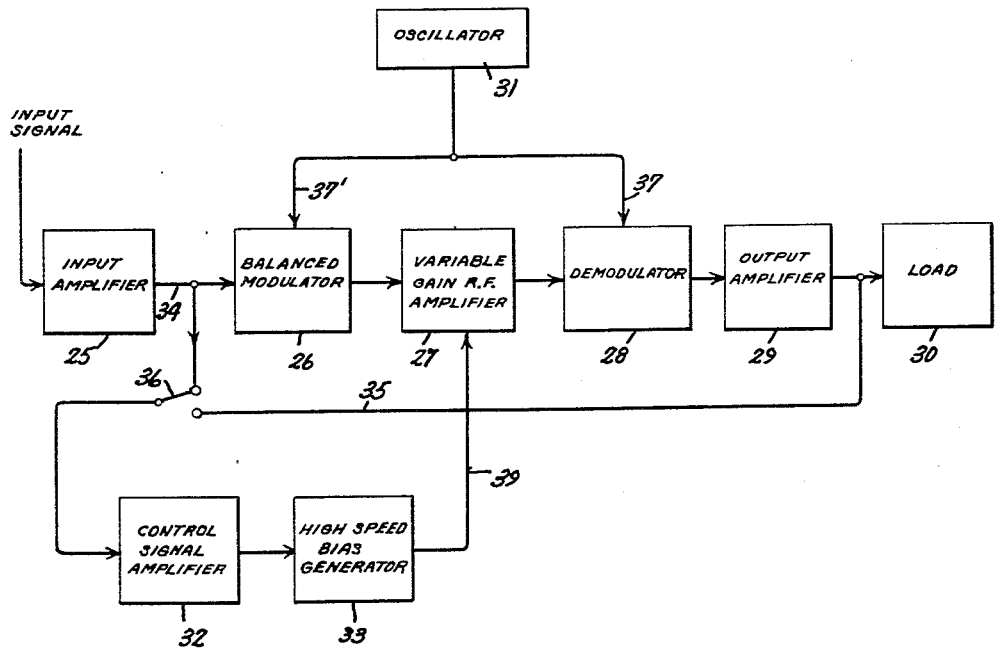
Figure 7 is a block diagram of the level governing modulation system of this invention.

Referring now to Figure 7, the arrows indicate the direction of signal passage through the elemental block diagram of the level governing amplifier system of this invention. The incoming signal is passed through an input amplifier 25 and successively to the balanced modulator 26, a variable-gain radio frequency amplifier 27, a demodulator 28, an output amplifier 29 and to a load 30. An oscillator 31 furnishes a reference carrier signal to the balanced modulator 26 and to demodulator 28. The gain of the radio frequency amplifier 27 is a function of the output of control signal amplifier 32 and high speed bias generator 33 operated in conjunction therewith. The input for the control signal amplifier 32 is obtained from the output of the amplifier 25 on conductor 34 for forward-acting gain control and is obtained from the output of amplifier 29 on conductor 35 for backward-acting gain control, depending upon the setting of switch 36, which is illustrated as set for forward-acting gain control.

The input amplifier 25 is of the constant-gain type and serves to drive the balanced modulator 26 which receives a high frequency signal from oscillator 31 on conductor 37 and produces a signal on conductor 38 of the suppressed-carrier double side-band type as explained above. The variable gain radio frequency amplifier 27 serves to control the side-band output signal level in accordance with a gain control bias on conductor 39 generated by bias generator 33. The bias generator 33 is designed so that any input signal peak, positive or negative, which exceeds a predetermined threshold voltage level, will develop a negative voltage related to the excess peak voltage over the threshold value. The negative voltage so developed is employed as the gain-control bias which serves to reduce the gain of the gain-control stage 27.

The modulator 26 and demodulator 28 are supplied by carrier frequency signals on conductors 37' and 37 from oscillator 31 which serves as a source of low power carrier signals at a frequency in the center of the band of frequencies over which the variable-gain amplifier 27 and modulator 26 are designed to operate. This frequency is not critical and may be from 5 to 50 megacycles per second. The audio frequency signal recovered from the demodulator 28 passes through a conventional output amplifier 29 to the load circuit 30.

The signal appearing on conductor 34 is converted to an equivalent form of radio frequency signal by the action of the balanced modulator 26. Variable-gain radio-frequency amplifier 27 transmits an amount, determined by the action of control signal amplifier 32 and bias generator 33, of this converted signal to demodulator 28 where it is reconverted into a gain-controlled replica of the audio input signal.

The balanced modulator 26 described in connection with Figures 1 to 5 and capable of balancing out carrier signal and of maintaining stable balance is an essential requirement of this level governing modulation system. Any carrier signal appearing in the output of modulator 26 would be subject to amplification in variable-gain radio-frequency amplifier 27. Demodulation of any such carrier signal depends upon the phase of the carrier signal output with respect to the phase of the carrier supplied to demodulator 28.

Gain control transients can appear in the output signal only to the extent that carrier output exists in the output of modulator 26.

Thus, the present invention allows isolation of certain basic functions in separate portions of the level governing modulation system where each function may be accomplished by techniques best suited for the requirements of the system as a whole.

Figure 8:
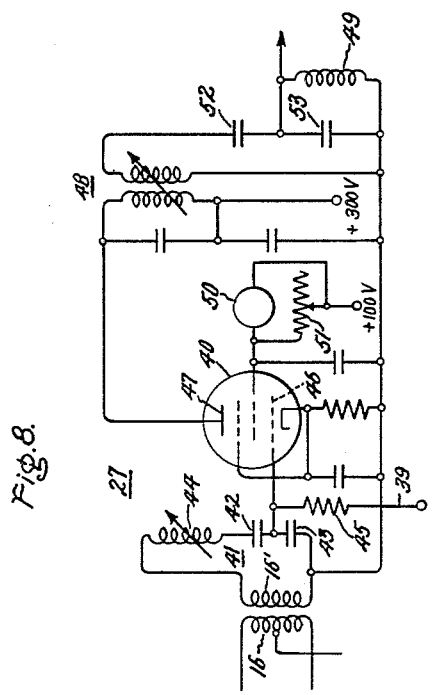
Figure 8 is a circuit diagram illustrating details of the variable gain radio frequency amplifier of Figure 7.

With reference to Figure 8 the variable-gain radio frequency amplifier 27 of Figure 7 employs a single remote cut-off or "variable mu" pentode 40, which may be of the type 6BA6. Even-order distortion due to this stage is entirely absent in its output because of the filtering action of the tuned circuits used in coupling the output to the demodulator 28. For this reason, the variable gain section of the system is inherently free from introducing even-order distortion to the recovered audio signal.

Resonant circuit 41, composed of series connected capacitors 42 and 43 and inductors 44 and 16', is excited by the signal output of the balanced modulator 26, inductor 16' acting as an inductive coupling means. Capacitors 42 and 43 serve as an attenuator to prevent overload of amplifier tube 40 and also provide a low driving source impedance so that a relatively low-valued resistor 45 can introduce bias from the bias generator 33 to the control grid 46 of pentode 40. The radio frequency signals appearing on the anode 47 are coupled by means of band-pass transformer 48 to the demodulator 28. A direct current return path for the demodulator is provided by radio frequency choke 49.

The screen grid voltage for the tube 40 may be supplied by a glow tube voltage stabilizer through a shunt connection of milliammeter 50 and adjustable calibrating resistance 51. The direct current registered by milliammeter 50 is a measure of the gain afforded by amplifier tube 40 and serves as an indication of gain reduction. Alternatively, the meter may be inserted in either the cathode or plate circuit of tube 40 to provide simple and accurate means for continuously indicating the magnitude of gain reduction.

Capacitors 52 and 53 act as an attenuator and as impedance reduction elements to maintain signal levels supplied to the demodulator 28 within suitable limits. The phase relationship afforded by the coupling transformer arrangements 41 and 48 serves to supply the demodulator 28 with signals having the correct phase relationship with respect to the output of oscillator 31 of Figure 7 when such devices are properly resonated for band-pass coupling.

Since no reference carrier reaches the demodulator 28 from the variable-gain amplifier stage 27, demodulator 28 is of the synchronous type and, therefore, is phase sensitive as well as amplitude sensitive. The radio frequency portion of the circuits must provide proper phase relationships between the reference carrier applied to the demodulator by the oscillator 31 over a path independent of the signal circuit and side-band signals reaching it from the amplifier 27. This is because the output of demodulator 28 varies as the cosine of the phase angle between the locus of the double side-band signals appearing in the output of amplifier 27 and the carrier from oscillator 31 against which these information-bearing components are demodulated. Low distortion in this portion of the system is assured by a high ratio of injected carrier signal from oscillator 31 to sideband signal applied by amplifier 27. Satisfactory demodulators for this purpose are disclosed in U.S. Patents 2,611,036 and 2,427,688, both of which are assigned to the same assignee as the present invention.

Slight misadjustment of the amplifier tuning and carrier time delay variations in the system have only minor effect on the signal recovered by demodulator 28, because this recovered signal is proportional to the cosine of the phase error so introduced. Conventional precautions are taken in design of the modulator-amplifier-demodulator portion of the system to allow nominal "in-phase" operation at demodulator 28 to assure that the effects of quadrature unbalance of carrier at the modulator stage are minimized. Thus, gain control thump, or crackle, is held to negligible proportions, less than $\frac{1}{10}\%$ of the output audio signal level when the gain of the system is reduced suddenly by an amount of 20 decibels.

In practice, adjustment of the amplifier tuning relative to the reference signal of the demodulator 28 for maximum recovered output signal is generally sufficient to reduce the effects of quadrature unbalance at the modulator by more than 20 decibels. This adjustment is readily accomplished without special instruments and relaxes the requirements for quadrature balance at the modulator stage so that deviations from perfect quadrature balance at this point are secondary in importance. Nevertheless, maximum freedom from gain control thump can be obtained by optimum quadrature balance of the modulator, since thump output due to unbalance of quadrature carrier signal at modulator 26 varies as the sine of the phase error between signals applied to demodulator 28 by amplifier 27 and by the oscillator 31, while the recovered signal varies as the cosine of this phase error. Thus, the tolerance on maintenance of phase relationships is optimized for a given system performance by adjusting modulator 26 for good quadrature balance.

Figure 9:
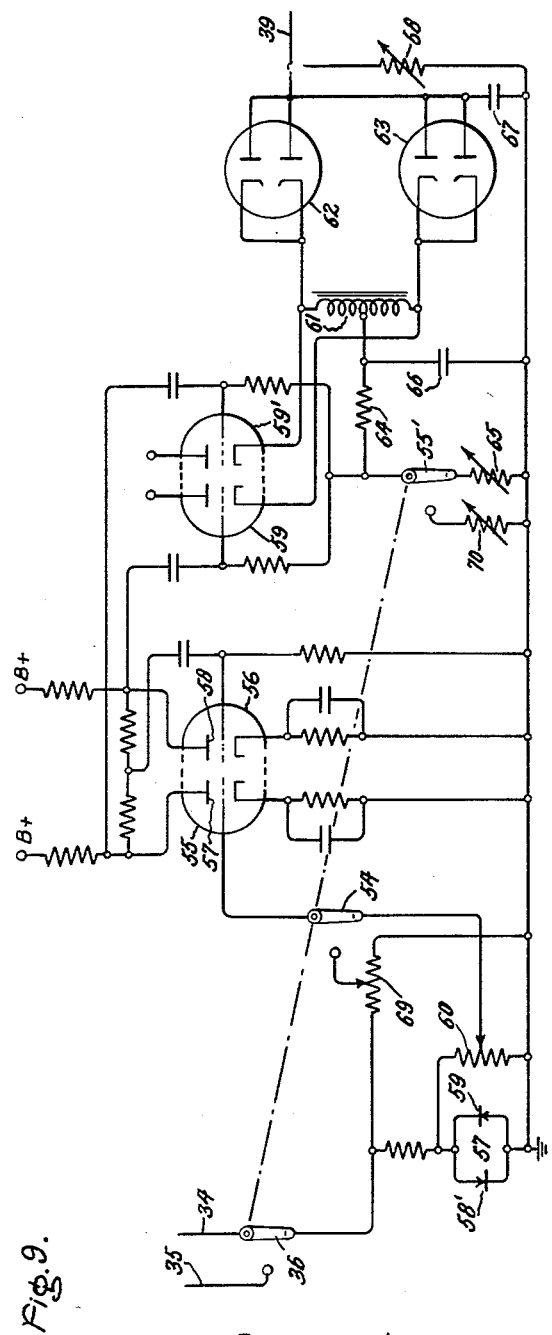
Figure 9 is a circuit diagram illustrating details of the control signal amplifier and high speed bias generator of Figure 7.

Figure 9 illustrates specific circuit details for the control signal amplifier 32 and for the bias generator 33 of Figure 1. For forward acting gain control, ganged switches 36, 54 and 55 are set in the position illustrated. A signal voltage on conductor 34 from the input amplifier of Figure 1 causes signal current to flow through resistor 56 and through a network 57 comprising back-to-back connected germanium diodes 58 and 59. Potentiometer 60 shunting the network is chosen to have a high resistance compared to the equivalent resistance of the germanium diodes. The characteristics of the network 57 are such that the peak voltage appearing across potentiometer 60 will bear a logarithmic relationship to the peak voltage supplied by the input amplifier 25. Moreover, this logarithmic relationship is substantially independent of frequency, and, therefore, amplitude distortion is present in the voltage across potentiometer 60. By adjustment of variable potentiometer 60, any desired fraction of the voltage across the network 57 may be applied through switch 54 to the control grid of thermionic triode 55.

The signal voltages on anodes 57 and 58, of opposite polarity and made equal by a choice of design parameters, are then applied to the grids of high perveance triodes 59 and 60 with the result that a replica of these voltages appears at the ends of center-tapped reactor 61 as well as upon the cathodes of high perveance diodes 62 and 63. The direct component of the plate currents of triodes 59 and 60 flows through resistor 64, through switch 55, and through adjustable resistor 65 to ground.

The function of resistor 64 is to provide proper grid bias for triodes 55 and 56. Variable resistor 65 provides an adjustable value of unipotential voltage which together with the voltage drop across resistor 64 and the incidental voltage drop across each half of center-tapped reactor 61 constitutes a delay bias for thermionic diodes 62 and 63. Capacitor 66 serves to stabilize the potential appearing on the center tap of reactor 61 over a period greater than that of the lowest signal voltage applied.

Thus, an amplified voltage proportional to the logarithm of the signal voltage from the input amplifier is applied to the cathodes of a diode pair which constitutes, together with an adjustable delay bias, the bias generator 33. It is obvious that when the combined peak of the signal voltage and delay bias applied to cathodes of high perveance thermionic diodes 59 and 60 is negative with respect to the anode voltage of these tubes, an electron current will flow through these diodes in such manner as to charge capacitor 67 negatively. The negative voltage which appears on conductor 39 is applied as a bias for variable gain radio frequency amplifier 27 of Figure 1, so as to reduce its gain.

If the combined signal voltage and delay voltage applied to the cathodes of diodes 62 and 63 is positive with respect to the anode voltage of these diodes, no electron current passes. Under these conditions the voltage on condenser 67 will decrease in accordance with the well known time-voltage characteristic governed by the values of capacitor 67 and the adjustable resistor 68. The time constant for the recovery of the gain reduction action is controlled by the shunt combination of condenser 67 and adjustable resistance 68. For example, if a recovery time constant of 0.2 second is desired, resistance 68 may have a value of 10 megohms and capacitor 67 a value of 0.02 microfarad.

In backward-acting gain control, switches 36, 54 and 55 are set to the position alternate to that shown and the signal voltage from output amplifier 29 of Figure 1 appears across resistor 70. An adjustable portion of this signal is applied directly to the grid of triode 55, and triode sections 55 and 56 operate in a manner similar to that of forward-acting gain control to provide signal and delay bias voltage to the cathodes of high perveance diodes 62 and 63. In this case, however, switch 55 is connected so that the cathode currents of the triodes 59 and 60 flow through adjustable resistance 70 which together with resistance 64 and incidental resistance in the center-tapped reactor 61 permits the adjustment or presetting of the value for delay bias. The action of diodes 62 and 63 in combination with resistance 68 and capacitor 67 is identical for both forward and backward-acting gain control.

In the forward mode of operation it is possible by coordinate adjustment of potentiometers 60 and 65 to control the gain of the variable gain radio frequency amplifier 27 in such a manner as to hold the output to the load at or below a certain chosen signal level for wide ranges of signal levels applied to the input amplifier 25 or, if desired, the output signal may be made to decrease with an increase in input signal amplitude greater than the threshold so chosen. Further, by similar adjustments, the output signal may be made to increase beyond a certain predetermined threshold in a manner similar to that described for backward-acting gain control in connection with Figure 6. It is apparent that in the backward mode of operation the output signal supplied to the load will necessarily increase as increasing signals are applied to the input amplifier 25 of this system.

In order to provide extremely rapid rates of gain reduction, it is necessary that the bias generator 33 develop a negative voltage on capacitor 67 at a corresponding rate. This requirement necessitates circuits which are capable of supplying large values of current for charging the capacitor 67. The push-pull cathode follower arrangement of the high perveance triodes 59 and 60 together with the high perveance diodes 62 and 63 provides for the flow of high charging current into capacitor 67 when signal conditions applied to the grids of triodes 55 and 56 call for gain reduction. The charging time constant of the system is determined by the effective resistance of the combination of the internal impedance of either triode 59 or 60, depending upon the polarity of the signal peak, and the forward resistance of either diode 62 or 63, together with the capacitance of capacitor 67. Typically, the equivalent charging source resistance is approximately 500 ohms, and, for the 0.02 microfarad value of capacitor 67 chosen illustratively above, the time constant of gain reduction action would be approximately 10 microseconds.

Thus, it can be seen that extremely rapid gain reduction rates can be accomplished on demand, so that signal peaks delivered to the load by the level governing modulation system of this invention can be regulated in accordance with the characteristics described above. Even when such rapid rates of gain reduction are obtained, it can be seen that the frequency spectrum of the gain reduction voltage can be restricted to a region below the frequency spectrum of a signal which passes through the variable gain radio frequency amplifier, and that, therefore, there is no gain reduction signal present in the output of the system.

While my invention has been described with reference to particular embodiments thereof, it is obvious that many variations therein are possible without departing from the spirit of this invention. Therefore, it is intended that the invention be limited only as may be necessitated by the scope of the appended claims.

What I claim as new and desire to secure by Letters Patent of the United States is:

1. A balanced modulator responsive to a reference carrier signal to convert an input signal to a suppressed-carrier double side-band output signal, said modulator comprising first and second diodes, a first parallel circuit including an inductive branch and a capacitive branch connecting the anode of said first diode and the cathode of said second diode, a second parallel circuit including a resistive path and a capacitive path connecting the cathode of said first diode and the anode of said second diode, an adjustable capacitor shunting one of said diodes to provide quadrature balance adjustment, an adjustable tap intermediate said resistive path to provide resistive balance adjustment to eliminate carrier signal components from the output of said modulator and intermediate taps in said inductive and capacitive branches of said first parallel circuit and in said capacitive path of said second parallel circuit, said intermediate taps providing the input terminals for said reference carrier signal and said input signal.

2. A balanced modulator responsive to a reference carrier signal to convert a signal in a first frequency band to a suppressed-carrier double side-band signal in a second frequency band, said modulator comprising first and second diodes, a first parallel circuit including an inductive branch and a capacitive branch connecting the anode of said first diode and the cathode of said second diode, a second parallel circuit including a resistive path and a capacitive path connecting the cathode of said first diode and the anode of said second diode, a variable intermediate tap in said resistive path and intermediate taps in said inductive and capacitive branches of said first parallel circuit and in said capacitive path in said second parallel circuit, the intermediate taps in one of said parallel circuits providing the input terminals for said reference carrier signal and said signal for applying the signals with respect to the intermediate taps of the other parallel circuit, an adjustable capacitor shunting one of said diode elements to provide quadrature balance adjustment, said variable adjustable tap intermediate said resistive path being effective to provide resistive balance adjustment to eliminate carrier signal components from the output of said modulator.

3. A modulator responsive to a reference carrier signal to convert a signal in a first frequency band to a suppressed-carrier double side-band signal in a second frequency band, said modulator comprising first and second diodes, a first parallel circuit including an inductive branch and a capacitive branch connecting the anode of said first diode and the cathode of said second diode, a second parallel circuit including a resistive path and a capacitive path connecting the cathode of said first diode and the anode of said second diode, intermediate taps in said inductive and capacitive branches of said first parallel circuit for input terminals for one of said signals, intermediate taps in said resistive and capacitive paths of said second parallel circuit for input terminals for the other of said signals, an adjustable capacitor shunting one of said diode elements to provide quadrature balance adjustment, the tap intermediate said resistive path being adjustable to provide resistive balance adjustment to eliminate carrier signal components from the output of said modulator.

4. A balanced modulator responsive to a reference carrier signal to convert an audio signal in first frequency band to a suppressed-carrier double side-band signal in a second frequency band, said modulator comprising first and second diodes, a first parallel circuit including an inductive branch and a capacitive branch connecting the anode of said first diode and the cathode of said second diode, a second parallel circuit including a resistive path and a capacitive path connecting the cathode of said first diode and the anode of said second diode, a variable intermediate tap in said resistive path and intermediate taps in said inductive and capacitive branches of said first parallel circuit and in said capacitive path in said second parallel circuit, the tap in said capacitive path being the input terminal for said reference carrier signal and the tap in said inductive branch being the input terminal for the audio signal for applying said signals with respect to the intermediate taps of the other parallel circuit, an adjustable capacitor shunting one of said diodes to provide quadrature balance adjustment, said variable tap intermediate said resistive path being effective to provide resistive balance adjustment to eliminate carrier signal components from the output of said modulator.

5. A level governing modulation system comprising balanced modulator means responsive to a high frequency carrier signal to convert an audio input signal to a band of frequencies displaced from the frequency of the input signal itself, gain control means for controlling gain in the converted signal in accordance with the predetermined characteristics of said input signal, demodulator means for reconverting the gain controlled signal to its original frequency band, said modulator means including first and second diodes, a first parallel circuit including an inductive branch and a capacitive branch connecting the anode of said first diode and the cathode of said second diode, a second parallel circuit including a resistive path and a capacitive path connecting the cathode of said first diode and the anode of said second diode, a variable intermediate tap in said resistive path and intermediate taps in said inductive and capacitive branches of said first parallel circuit and in said capacitive path in said second parallel circuit, the tap in said capacitive path being the input terminal for said reference carrier signal and the tap in said inductive branch being the input terminal for the audio signal for applying said signals with respect to the intermediate taps of the other parallel circuit, an adjustable capacitor shunting one of said diodes to provide quadrature balance adjustment, said variable tap intermediate said resistive path being effective to eliminate gain control noise from the output of said system.

6. A circuit responsive to a carrier signal for converting an input signal in a first frequency band to a suppressed-carrier double side-band signal in a second frequency band, said circuit comprising: first and second rectifiers, each of which has a current-carrier emitter electrode and a current-carrier collector electrode; a variable capacitor connected in shunt with said first rectifier; a capacitor connected in shunt with said second rectifier; a parallel circuit including a resistance path and a capacitance path connected in parallel between the current-carrier emitter electrode of said first rectifier and the current-carrier collector electrode of said second rectifier; a resonant circuit connected between the current-carrier collector electrode of said first rectifier and the current-carrier emitter electrode of said second rectifier; intermediate taps in said paths of said parallel circuit and in said resonant circuit for input terminals for said carrier signal and said input signal; and means for deriving an output from said resonant circuit.

7. The circuit as defined in claim 5 wherein said parallel circuit comprises two capacitors connected in series with a terminal between them providing an input terminal for at least one of said carrier and input signals, and a plurality of resistors connected in parallel with said series connected capacitors wherein at least one of said resistors is a potentiometer having a movable center tap providing an input terminal for at least one of said signals.

8. The circuit as defined in claim 5 wherein said resonant circuit comprises two capacitors connected in series with a terminal between them providing an input terminal for at least one of said input and carrier signals and an inductor connected in parallel with said series connected capacitors wherein said inductor has an intermediate tap providing an input terminal for at least one of said signals.

9. The circuit as defined in claim 5 wherein said parallel circuit comprises two capacitors connected in series with a terminal between them providing an input terminal for at least one of said carrier and input signals; and a plurality of resistors including a potentiometer connected in parallel with said series connected capacitors, wherein said potentiometer has a movable tap providing an input terminal for at least one of said signals; and wherein said resonant circuit comprises two capacitors connected in series with a terminal between them providing an input terminal for at least one of said signals, and an inductor connected in parallel with said last-mentioned series connected capacitors, wherein said inductor has an intermediate tap providing an input terminal for at least one of said signals.

References Cited in the file of this patent

UNITED STATES PATENTS

| | | |
|---|---|---|
| 1,550,660 | Affel | Aug. 25, 1925 |
| 1,673,002 | Fearing | June 12, 1928 |
| 2,379,484 | Haynes | July 3, 1945 |
| 2,478,023 | Summerhayes et al. | Aug. 2, 1949 |
| 2,520,621 | Beers | Aug. 29, 1950 |
| 2,564,471 | Eaton | Aug. 14, 1951 |

OTHER REFERENCES

"Balanced Crystal-Diode Modulator," Radio-Electronic Engineering, September 1953, pp. 10, 11 and 27.